No. 749,566. PATENTED JAN. 12, 1904.
C. E. KNOCH.
BARROW WHEEL.
APPLICATION FILED MAR. 7, 1903.
NO MODEL.
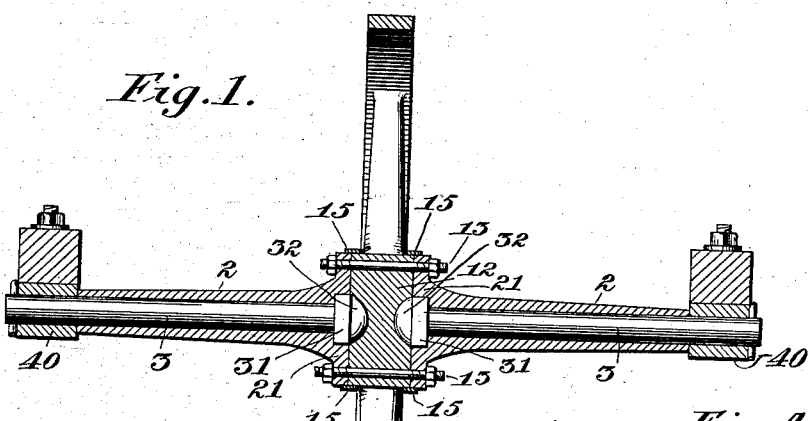
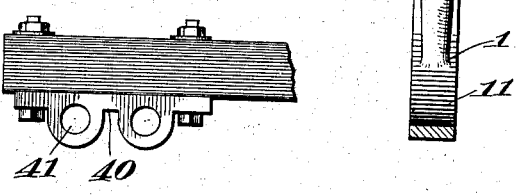
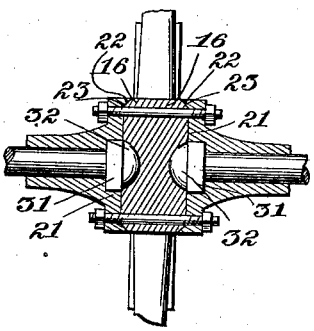
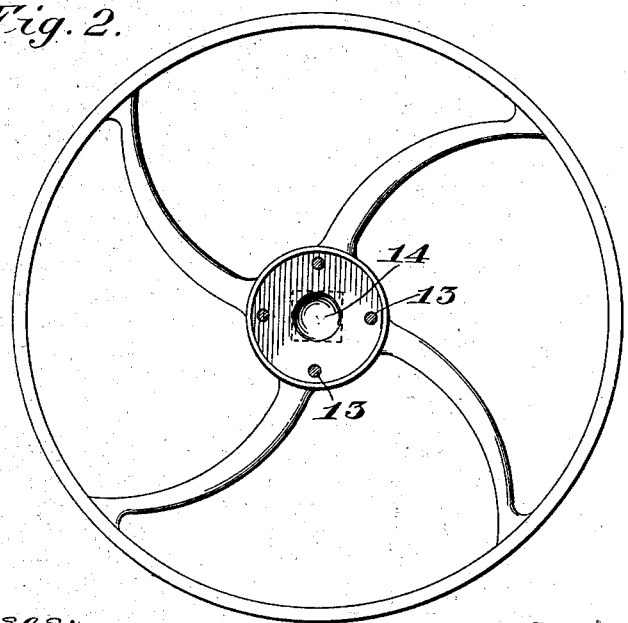
Witnesses:
Fred Phillips
Inventor:
Charles Emil Knoch No. 749,566. Patented January 12, 1904.

UNITED STATES PATENT OFFICE.

CHARLES EMIL KNOCH, OF CHARLEROI, PENNSYLVANIA.

BARROW-WHEEL.

SPECIFICATION forming part of Letters Patent No. 749,566, dated January 12, 1904.

Application filed March 7, 1903. Serial No. 146,656. (No model.)

*To all whom it may concern:*

Be it known that I, CHARLES EMIL KNOCH, a citizen of the United States, residing at Charleroi, in the county of Washington and State of Pennsylvania, have invented a new and useful Improvement in Barrow-Wheels, of which improvement the following is a specification.

My invention relates to wheels for barrows of general use, and more especially for carrying heavy loads of earth, stone, ore, coke, metals, &c., whereby strength and durability are deftly attained and easily-replaceable parts in case of repair, especially the gudgeons and bearing-blocks. As now constructed the gudgeons are attached to the spindles in such a manner that it racks the wheel to replace one or causes the loss of the wheel, owing to the cost of repairing the same. The projection on the flanges or band encircling the periphery of the edges of the flanges and hub materially add strength and rigidity to the wheel. The countersunk gudgeon-heads are for the purposes of securing the same in the spindles and sustaining torsional strains. The advantages of the reversible bearing-blocks are apparent and economical.

The object of my invention is to construct a barrow-wheel of great strength, rigidity, and durability, with easily-repairable parts, as will more readily appear in the specification.

To enable others skilled in the art to make and use my invention, I will describe the same more fully, referring to the following specification and accompanying drawings, in which—

Figure 1 is a longitudinal vertical section of the wheel and its axle. Fig. 2 is a view of the wheel-body. Fig. 3 is a view of the bearing-block reversed. Fig. 4 is the modification of attaching flanges to the hub.

Like numerals refer to like parts in each of the figures of the drawings.

In constructing my improved wheel the body 1 is made of metal and is provided with the spokes 10, rim 11, and hub 12. The said hub 12 is formed with a circular periphery 16, which may be beveled to fit the inclined projection 23 of the flange 21, and provided with circular concave sockets 14 on each side the center of the hub 12 to receive the inner ends of the gudgeons. The series of holes 13 are to receive the bolts holding the flanges of the spindle to the hub 12. A wrought-iron tire usually encircles the wheel to strengthen it. Attached to each side of the hub 12 are the flanges 21 of the spindles 2. These spindles 2 are made hollow to receive the gudgeons 3. The spindles 2 and gudgeons 3 form the axle of the wheel. These spindles 2 have flanges 21 at their inner ends abutting and bolted to the hub 12, the periphery of which is made to conform with the periphery of the hub, so that an encircling band 15 secures both and helps sustain them in place, or in a modified form the projection 22 is formed integral thereto and is provided with inclined inner faces 23, made to fit the beveled periphery 16 of the hub 12. The spindles are secured to the hub by a series of bolts, which pass through the flanges of the spindles and the holes of the hub 12. The said bolts are provided with nuts to secure them. The gudgeons 3 are formed with a bolt and angular heads 31, provided with turned or hemispherical inner ends 32, adapted to fit in the circular socket 14, thereby centering the wheel and bearing a portion of the shearing strain from the bolts which secures the flanges of the spindles to the hub and the band 15 encircling the hub. The head is made hemispherical to even the transfer of the weight onto the hub of the revolving wheel. The angular part of the heads of the gudgeons are countersunk in the sockets formed in the inner ends of the spindles to resist the torsional strain. They are thus made removable in order that when the journal ends become worn or broke they can be removed, repaired, and replaced without the loss of the entire wheel.

To attach the gudgeons of the axle to the side bars of the barrow-frame, I secure a reversible bearing-block. The said bearing-blocks have a bushing integral to the same formed in each end in order that when the bushings become enlarged by wear they may be reversed and used, thus getting double service from the same block. Should the wheel at any time or ever become broken, the part affected may be easily removed and replaced without the loss of the entire wheel.

Having now described my invention, what I claim is—

1. In a barrow-wheel, the combination, with a wheel-body having a central hub forming part thereof, two removable gudgeons, one of the said gudgeons extending through each of the spindles substantially as and for the purposes set forth.

2. In a barrow-wheel, the combination, with a wheel-body having a circular concave socket, on each side and in the center thereof, of a spindle attached to each side of the body and each having a removable gudgeon extending through the same, and each gudgeon having a spherical end to fit said socket substantially as set forth and described.

3. In a barrow-wheel, the combination, with a wheel-body having a central hub forming part thereof, the said hub having beveled peripheries, of metallic spindles attached by the flanges to each side of said hub, each of the said flanges is provided with a projection, adapted to fit on the periphery on the said hub, and removable gudgeons, substantially as set forth and described.

4. In a barrow-wheel, the combination, with a wheel-body having a central hub forming part thereof, of spindles attached to the sides of the said hub, each spindle having a central countersink in the inner end, and each spindle having a removable gudgeon, each of the said gudgeons is provided with an angular countersunk head on the inner end, substantially as set forth and described.

5. In a barrow-wheel, the combination, with a wheel-body having a circular concave socket on each side of the hub and in the center thereof, of spindles attached to the sides of the said hub, each spindle having a central countersink in the inner end thereof and a removable gudgeon, the said gudgeon being provided with an angular countersunk headed inner end and spherical head adapted to fit the said countersink and socket substantially as set forth and described.

6. In a barrow-wheel, the combination, with a wheel-body having a central hub forming part thereof, of metallic spindles attached to the side of the said hub, each of the said spindles are provided with a gudgeon, flange, and two bands, each encircling the edge of said flange and part of the periphery of the said hub, substantially as and for the purposes set forth.

In testimony whereof I have hereunto signed my name in the presence of two subscribing witnesses.

CHARLES EMIL KNOCH.

In presence of—
F. F. FLICKINGER,
L. P. FLICKINGER.